United States Patent [19]
Peterson

[11] Patent Number: 6,015,044
[45] Date of Patent: Jan. 18, 2000

[54] PAPERBOARD CARRIER FOR STATIC CLING VINYL PRODUCTS

[75] Inventor: Ralph Scott Peterson, Clifton Forge, Va.

[73] Assignee: Westvaco Corporation, New York, N.Y.

[21] Appl. No.: 08/819,641

[22] Filed: Mar. 17, 1997

Related U.S. Application Data

[62] Division of application No. 08/387,333, Feb. 13, 1995, Pat. No. 5,643,388.

[51] Int. Cl.⁷ ........................................................ B65D 5/00
[52] U.S. Cl. .......................................... 206/460; 206/524.1
[58] Field of Search ......................... 156/272.6; 206/460, 206/484, 524.1, 524.2, 524.3, 524.4

[56] References Cited

U.S. PATENT DOCUMENTS

| | | |
|---|---|---|
| 4,209,584 | 6/1980 | Joseph . |
| 4,400,419 | 8/1983 | Laczynski . |
| 4,475,969 | 10/1984 | Reed . |
| 4,652,239 | 3/1987 | Brimberg . |
| 4,802,943 | 2/1989 | Gibbons et al. . |
| 4,806,398 | 2/1989 | Martin, Jr. . |
| 4,861,526 | 8/1989 | Gibbons et al. . |
| 4,871,406 | 10/1989 | Griffith . |
| 4,966,280 | 10/1990 | Bradford . |
| 5,088,643 | 2/1992 | Frazier et al. . |
| 5,098,497 | 3/1992 | Brinley . |
| 5,102,171 | 4/1992 | Saetre . |
| 5,116,649 | 5/1992 | Massouda . |
| 5,161,687 | 11/1992 | Kornell et al. . |
| 5,171,308 | 12/1992 | Gallagher et al. . |
| 5,174,605 | 12/1992 | Instance . |
| 5,302,402 | 4/1994 | Dudenhoeffer et al. . |
| 5,334,431 | 8/1994 | Longtin . |
| 5,361,904 | 11/1994 | Kapec et al. . |
| 5,395,471 | 3/1995 | Obijeski et al. . |
| 5,643,388 | 7/1997 | Peterson ................................ 156/272.6 |

FOREIGN PATENT DOCUMENTS

| | | |
|---|---|---|
| 0172142 | 2/1986 | European Pat. Off. . |
| 2705378 | 8/1977 | Germany . |
| 2821435 | 11/1979 | Germany . |
| 46-12082 | 3/1971 | Japan . |
| 58-22134 | 2/1983 | Japan . |
| 60-197740 | 10/1985 | Japan . |
| 62-59037 | 3/1987 | Japan . |
| 4-1043 | 1/1992 | Japan . |

OTHER PUBLICATIONS

D.A. Markgraf, Corona Treatment, 1986 Coextrusion/—TAPPI seminar Notes, pp. 85–91.

J. C. von der Heide and H.L. Wilson, Guide to corona film treatment, Modern Plastics, May 1961, pp. 199–206 and 344.

*Primary Examiner*—Jacob K. Ackun
*Attorney, Agent, or Firm*—J. R. McDaniel; R. L. Schmalz

[57] ABSTRACT

This invention relates to paperboard materials for carrying static cling vinyl products for transport to end users. Such structures of this type, generally, provide good adhesion for the static cling vinyl product, but allow the vinyl product to be peeled off easily.

3 Claims, No Drawings

PAPERBOARD CARRIER FOR STATIC CLING VINYL PRODUCTS

This application is a: division of application Ser. No. 08/387,333 filed Feb. 13,1995 now U.S. Pat. No. 5,643,388.

BACKGROUND OF THE INVENTION

1. Field of the Invention

This invention relates to paperboard materials for carrying static cling vinyl products for transport to end users. Such structures of this type, generally, provide good adhesion for the static cling vinyl product, but allow the vinyl product to be peeled off easily.

2. Description of the Related Art

It is known, in current carriers for static cling vinyl products, to employ a poly-coated cast-coated paperboard. Exemplary of such prior art is U.S. Pat. No. 4,652,239 ('239), to B. J. Brimberg entitled "Space Planning System and Method". While the cast-coating of the '239 patent provides a smooth surface for retaining the static cling vinyl products, the cast-coated material of the '239 patent is not readily available and is very expensive. Consequently, a more advantageous carrier, then, would be presented if the expensive cast-coated material could be eliminated.

It is apparent from the above that there exists a need in the art for a carrier for static cling vinyl products which is light weight, and which at least equals the static cling characteristics of the known carriers, but which at the same time eliminates the use of the expensive cast-coated material. It is the purpose of this invention to fulfill this and other needs in the art in a manner more apparent to the skilled artisan once given the following disclosure.

SUMMARY OF THE INVENTION

Generally speaking, this invention fulfills these needs by providing a method for producing a paperboard carrier for static cling vinyl products, the steps comprising: extruding a layer of a polymeric material substantially over a paperboard carrier base; contacting said extruded layer with a cooling means in order to substantially smooth out said extruded layer; surface treating said extruded layer to raise a surface energy of said extruded layer to provide adhesion between said paperboard carrier and said static cling products; and securing a static cling vinyl product to said extruded layer.

In certain preferred embodiments, particulate minerals preferably, clay, may be coated on the paperboard base. Also, the polymeric material is high density polyethylene (HDPE). Also, the cooling means is a chill roll. Finally, the step of surface treating is accomplished through the use of a corona discharge or flame treatment.

In another further preferred embodiment, the paperboard carrier provides good adhesion for the static cling vinyl product, but allows the product to be easily peeled off.

The preferred carrier, according to this invention, offers the following advantages: excellent adhesion for static cling vinyl products; lightness in weight; ease of assembly; good stability; good durability; good economy; and ease of static cling vinyl product removal. In fact, in many of the preferred embodiments, these factors of excellent adhesion and ease of product removal are optimized to the extent that is considerably higher than heretofore achieved in prior, known carriers.

The above and other features of the present invention, which will become more apparent as the description proceeds, are best understood by considering the following detailed description.

DETAILED DESCRIPTION OF THE INVENTION

Initially, a paperboard base having a thickness of between 0.007 to 0.035 inches is coated on one side with a coating of particulate minerals, preferably, clay. However, it is to be understood that the particulate coating may be omitted. The paperboard may be formed from bleached pulp stock or recycled paperboard.

After the paperboard base is coated with the particulate minerals, the coated side of the paperboard base is then extrusion coated with high density polyethylene (HDPE). The extrusion coating is applied according to conventional techniques. After the extrusion coating is applied, a chill roll which, preferably, has a rms value of less than one microinch is contacted against the HDPE extrusion coating. In this manner, the chill roll imparts a smooth surface to the HDPE layer.

After the HDPE layer has been smoothed, the HDPE layer is the treated with a conventional corona discharge or flame treatment in order to raise the surface energy of the HDPE layer. Once the HDPE layer has been treated, a paperboard carrier for static cling vinyl products is produced which provides adequate adhesion between the carrier and the static cling vinyl products. Finally, a static cling vinyl product is placed upon the carrier for shipment to the end user.

It is to be understood that an extrusion of low density polyethylene (LDPE) or a coextrusion of LDPE and polyethylene terephethalate may be used instead of HDPE.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A paperboard carrier for carrying static vinyl products, wherein said carrier is comprised of:

a paperboard carrier base;

an extruded layer of high density polyethylene located exterior to said paperboard base such that said polyethylene layer is cooled and surface treated to provide a predetermined smoothness and surface energy to said polymeric layer; and a static cling vinyl product operatively attached to said extruded layer.

2. The paperboard carrier, as in claim 1, wherein said carrier is further comprised of:

a layer of particulate minerals located substantially between said paperboard carrier base and said extruded layer.

3. The paperboard carrier, as in claim 1, wherein said particulate minerals is further comprised of:

clay.

* * * * *